US008528496B2

(12) United States Patent
Houben et al.

(10) Patent No.: US 8,528,496 B2
(45) Date of Patent: Sep. 10, 2013

(54) MULTI COMPONENT PARTICLE GENERATING SYSTEM

(75) Inventors: Rene Jos Houben, Nederweert (NL); Andries Rijfers, Kamerik (NL); Leonardus Antonius Maria Brouwers, Beesel (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 203 days.

(21) Appl. No.: 13/002,646

(22) PCT Filed: Jul. 7, 2009

(86) PCT No.: PCT/NL2009/050408
§ 371 (c)(1),
(2), (4) Date: Apr. 4, 2011

(87) PCT Pub. No.: WO2010/005302
PCT Pub. Date: Jan. 14, 2010

(65) Prior Publication Data
US 2011/0177243 A1 Jul. 21, 2011

(30) Foreign Application Priority Data
Jul. 7, 2008 (EP) .................................... 08159787

(51) Int. Cl.
*B05C 5/00* (2006.01)
*B05C 5/02* (2006.01)
*B05C 15/00* (2006.01)
(52) U.S. Cl.
USPC ............................ 118/303; 118/300; 118/319

(58) Field of Classification Search
USPC .................................................. 118/DIG. 16
See application file for complete search history.

(56) References Cited

U.S. PATENT DOCUMENTS

| 3,288,052 | A | * | 11/1966 | Hough ............................. 99/485 |
| 4,375,440 | A | * | 3/1983 | Thompson ....................... 164/46 |
| 5,230,735 | A | | 7/1993 | Murata et al. |
| 5,487,916 | A | * | 1/1996 | Christensen ................... 427/213 |

FOREIGN PATENT DOCUMENTS

| EP | 0 563 402 A1 | | 10/1993 |
| GB | 2 067 908 A | | 8/1991 |
| WO | WO 93/11844 | * | 6/1993 |
| WO | WO 93/11844 A1 | | 6/1993 |
| WO | WO 94/17941 A1 | | 8/1994 |

* cited by examiner

*Primary Examiner* — Dah-Wei Yuan
*Assistant Examiner* — Jethro Pence
(74) *Attorney, Agent, or Firm* — Kilpatrick Townsend & Stockton LLP

(57) ABSTRACT

The invention relates to a method of generating a multicomponent particle comprising: and a multicomponent particle generating system comprising a movable support constructed to accelerate particles supplied on the movable support; a particle supply system for supplying the particles to the movable support; at least one nozzle arranged to generate a generally uninterrupted fluid jet along at least part of a circumference of the movable support without breaking up; to have said accelerated particles collide with the fluid jet so as to combine said particles with fluid of the fluid jet, for providing a multicomponent particle; and a collector arranged in the trajectory of said particles, by which said particles can be captured after collision with the fluid jet.

11 Claims, 7 Drawing Sheets

MULTI COMPONENT PARTICLE GENERATING SYSTEM

CROSS-REFERENCES TO RELATED APPLICATIONS

This application is a U.S. National Stage of International Application No. PCT/NL2009/050408, filed Jul. 7, 2009, and which claims the benefit of European Patent Application No. 08159787.4, filed Jul. 7, 2008 the entireties of which are incorporated by reference herein.

The invention relates to a multi component particle generating system.

U.S. Pat. No. 5,230,735 discusses a system for mixing powder particles with fluid material via a wetted inner wall. This system easily leads to clogging and coagulation of powder particles. Therefore, the provision of individually generated multicomponent particles is not possible. A similar mechanism is illustrated in U.S. Pat. No. 2,067,908.

Furthermore, EP0563402 discloses a granule coating apparatus wherein a powder nozzle is formed to have a central powder blowout opening and a concentrically arranged tapered coating liquid blowout path. This system is provided to form good intermixing with the powder and the liquid, however, due to the form of the blowout jet, individual coating control of particles is not possible and coagulation is likely to occur.

In one aspect, the invention aims to provide a multicomponent particle generating system that mitigates the problems discussed above and that can provide for coating and/or intermixing of isolated particles. To this end, a continuous particle generating system is provided according to the features of claim 1. In particular, a multicomponent particle generating system is provided comprising: a movable support constructed to accelerate particles supplied on the movable support; a particle supply system for supplying the particles to the movable support; at least one nozzle arranged to generate a generally uninterrupted fluid jet along at least part of a circumference of the movable support without breaking up; to have said accelerated particles collide with the fluid jet so as to combine said particles with fluid of the fluid jet, for providing a multicomponent particle; and a collector arranged in the trajectory of said particles, by which said particles can be captured after collision with the fluid jet.

In addition, the invention provides a method of generating a multicomponent particle comprising: accelerating particles supplied on a movable support; generating a generally uninterrupted fluid jet without breaking up along at least part of a circumference of the movable support; colliding said accelerated particles with the fluid jet so as to combine said particle with the fluid jet material; and capturing said isolated particles after collision with the fluid jet.

By colliding the particles in the above described manner, a large volume of special purpose multicomponent particles can be created.

Other features and advantages will be apparent from the description, in conjunction with the annexed drawings, wherein.

In the figures, identical or similar structures will be referenced with corresponding reference numerals.

Figure 1:
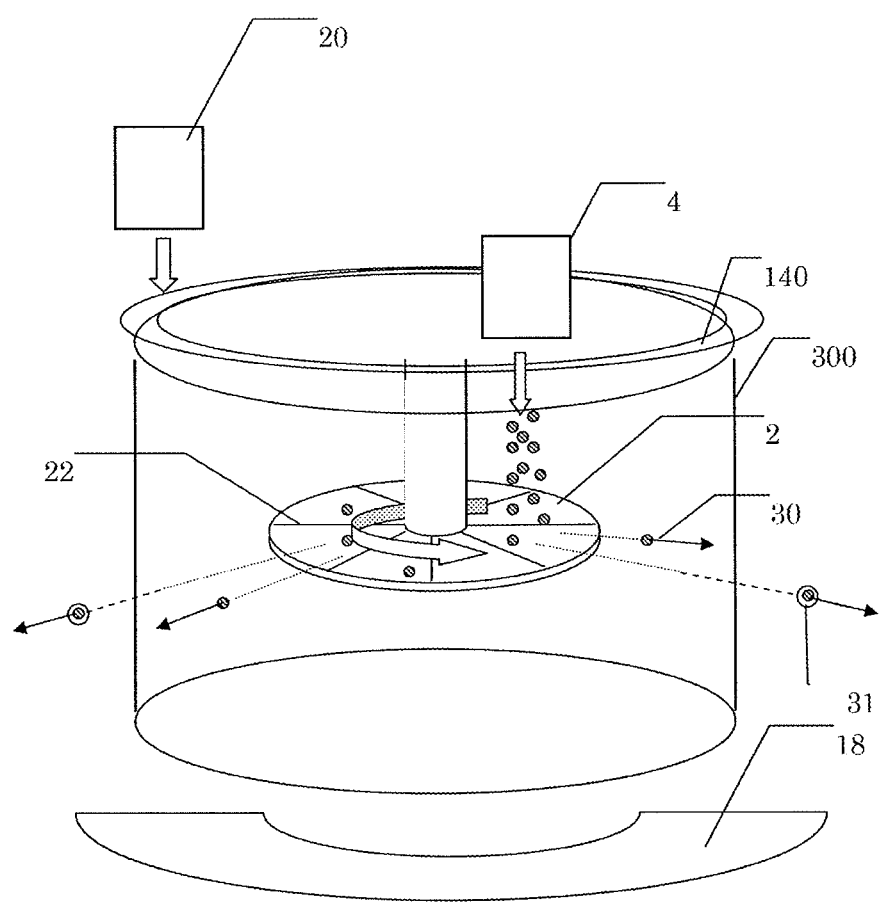
FIG. 1 shows schematically a perspective view of an embodiment of a printing system for use in the present invention.

FIG. 1 shows schematically the accelerating apparatus in the form of a rotating disc 2 for accelerating the particles 30. These particles may be supplied in dry or moist solid form, or liquid form to the rotating disc from a particle supply system 4. Conveniently, the rotating disc 2 has a surface structure, for example, radially extending ridges 22 arranged to impact the particles and to support radial acceleration. This particle generating system 2 is able to generate isolated particles in the form of powders, grains granules or droplets 30 to be directed in radial directions towards fluid jet 300. Further, the apparatus 2 is provided with a collector 18 by which particular drops can be captured. The collector 18 arranged in the trajectory of said particles for instance, circumferentially around the rotating disc, and functions to capture the particles flying through the fluid jet into the collector 18. Collector 18 is thus able to collect the particles after collision, typically, after having flown in a free flight sufficiently to be able to collect the particles substantially individually, for example, after a dry-out phase or a chemical reaction phase in free flight, the collector 18 arranged in the free flight trajectory of the particle 30. Screen collector 19 may be arranged to collect the uninterrupted fluid jet, after collision with the particle.

The rotating disc accelerates through centrifugal force the particles 30 to fly as coated particles 31, after collision with the fluid jet 300, in free flight towards a collector 18.

In addition, a pressure system 20 is provided comprising a nozzle 140. The nozzle 140 is arranged to generate a generally uninterrupted fluid jet 300 along at least part of a circumference of the rotatable disc 2 without breaking up.

Preferably the nozzle 140 is slitted to produce a sheet form or curtain form uninterrupted fluid jet having a relatively thin thickness of about several microns, preferably less than 1500 micron, to arrive at smaller thicknesses. Typically, the sheet form jet, at a particle 30 traversing place has a thickness which is relatively thin so that the particles 30 can traverse without being caught by the jet. The jets may have varying forms such as concentric forms flat shapes or curved shapes, but are essentially not disturbed near a particle traversing location, contrary to, for example, such as in EP0563402 by transverse directed flows of additional jets. The pressure system 20 is arranged to direct the fluid jet 300 at an angle (preferably transverse) relative to the direction of the beam of the isolated particles 30 accelerated by rotating disc 2. Clearly, as follows from the described embodiments and related figures, in this context, the term "isolated" refers to the feature that particles are generated substantially separate from each other, and that, although having arbitrary incidence frequency, particles will be spatially separated when directed towards the jet. This can be promoted by adjusting the rotation speed of the disc 2 and choosing disc diameter and the interdistance of the disc to the fluid jet to provide sufficient acceleration, particle separation and particle penetration velocity through the jet 300.

Accordingly, as will be further illustrated in the examples a particle is formed coated with the second fluid of the fluid jet 300 to provide a multicomponent particle 31.

The FIG. 1 embodiment illustrates a collision of the particles 30 with the fluid jet 300 in a transmissive mode, that is that the particles 30 penetrate the fluid jet 300 from one side to the other side. Further, although FIG. 1 only illustrates a single nozzle system 14 for generating the particles 30 a plurality of nozzles 140 can be provided to have the particles collide with the a plurality of fluid curtains place, seen in radial direction, circumferentially adjacent or radially adjacent. When placed at different positions along a radius, accelerated particles may traverse, prior to collection, several fluid curtains to receive multiple coatings or collisions.

Figure 2:
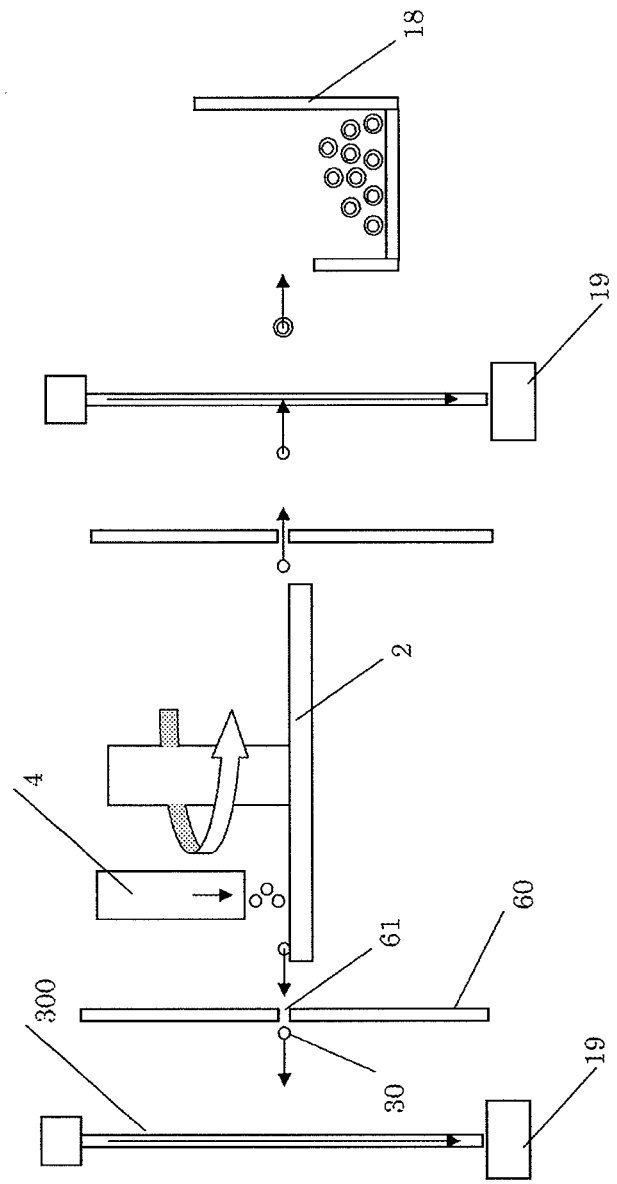
FIG. 2 shows schematically a side view of the embodiment of FIG. 1, including a shield structure.

FIG. 2 shows schematically a side view of the embodiment of FIG. 1, including a windshield structure 60. For the rotating disc arrangement, this shield structure 60 is cylindrically designed circumferentially arranged and concentric relative to the rotating disc 2. Thus, turbulence that is created by the high speed spinning disc 2, including the particle movements, is substantially blocked from the fluid jet 300. The shield 60 comprising a release opening 61 arranged in a trajectory of the particles 30, to release the particles 30 through the shield 60 towards the jet 300.

Figure 3:
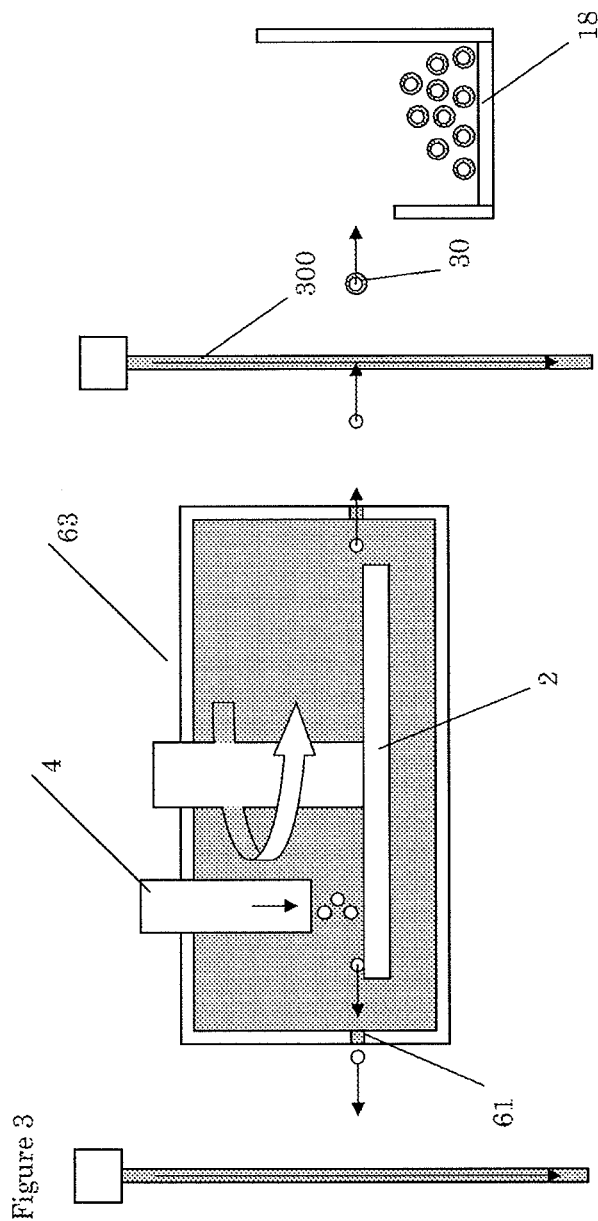
FIG. 3 shows schematically a side view of the embodiment of FIG. 2 including a modified shield structure.

FIG. 3 shows schematically a side view of the embodiment of FIG. 2 including a modified shield structure 63. In this embodiment, the shield structure forms a box substantially enclosing the rotating disk 2. By the rotating movement, air will be spinned out of the box until equilibrium is achieved between air entering the box 63 due to under pressure in the system—thus arriving at a stable airflow that does not interrupt the fluid 300.

Figure 4:
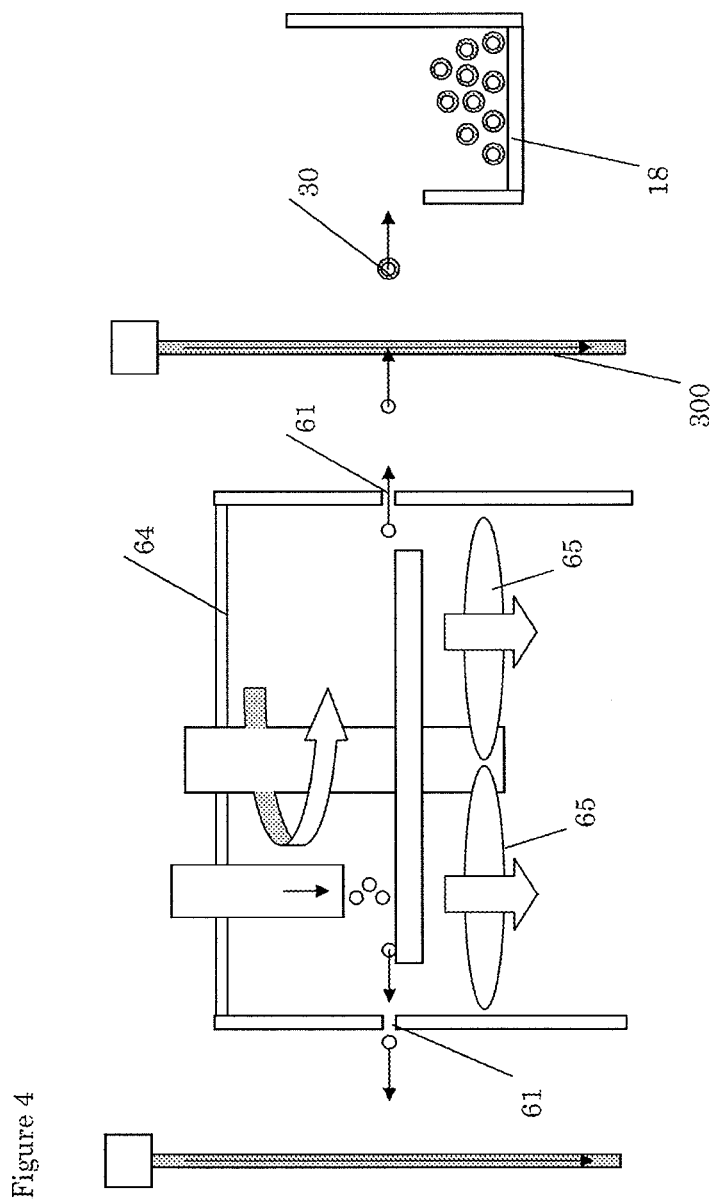
FIG. 4 shows schematically a side view of another embodiment of the shield structure.

FIG. 4 shows schematically another embodiment of the shield structure: a disc 2 partially enclosed by a chamber 64, optionally having air fans 65 installed to vacuate the chamber 64 or at least to stabilize the air flows in the chamber 64 to prevent an air flow disturbing the jet 300. By this embodiment, particles 30 can leave the slit opening 61 substantially free from an additional airflow, since the air is forced out of the chamber 64 by fans 65. The embodiments of FIG. 3 and FIG. 4 thus show shield structures comprises a substantially closed or at least semi closed boxes 63, 64, to prevent air flowing into the box 63, 64. This can be enhanced by providing the boxes 63, 64 with an evacuation pump such as fans 65. It is noted that the rotating disc 2 may be designed to have a fan function, for example, by having a blade structure incorporated in the disc 2.

Figure 5:
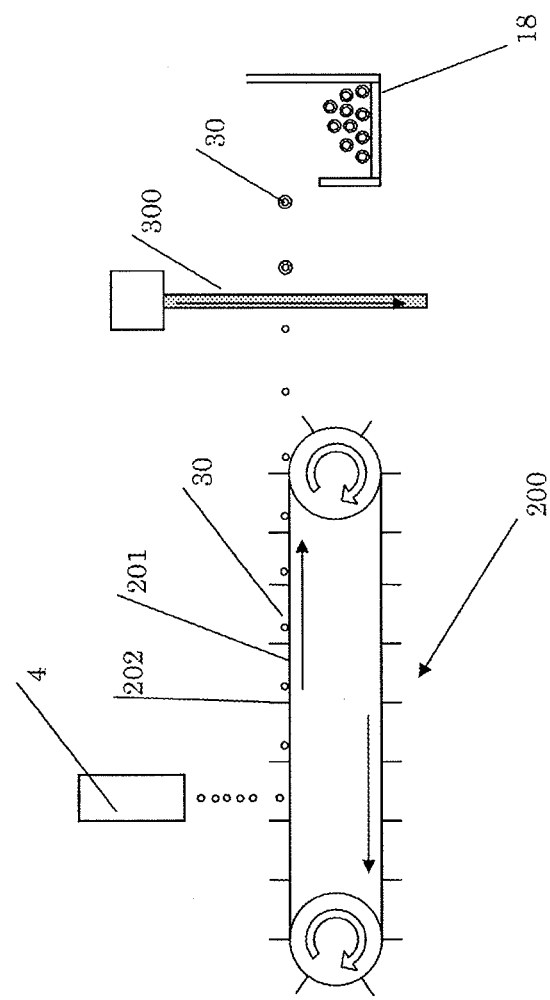
FIG. 5 shows schematically a side view of another embodiment of the movable support.

FIG. 5 shows schematically in side view another embodiment of the movable support, in the form of a linear conveyor 200 having endless conveyor belt 201. Typically, the belt may have upstanding ridges 202 to evenly distribute and accelerate particles 30 supplied from supply 4. This embodiment can be screened likewise as in previous embodiments. By isolated supply of the particles 30, isolated particles can be accelerated through the jet 300.

Figure 6:
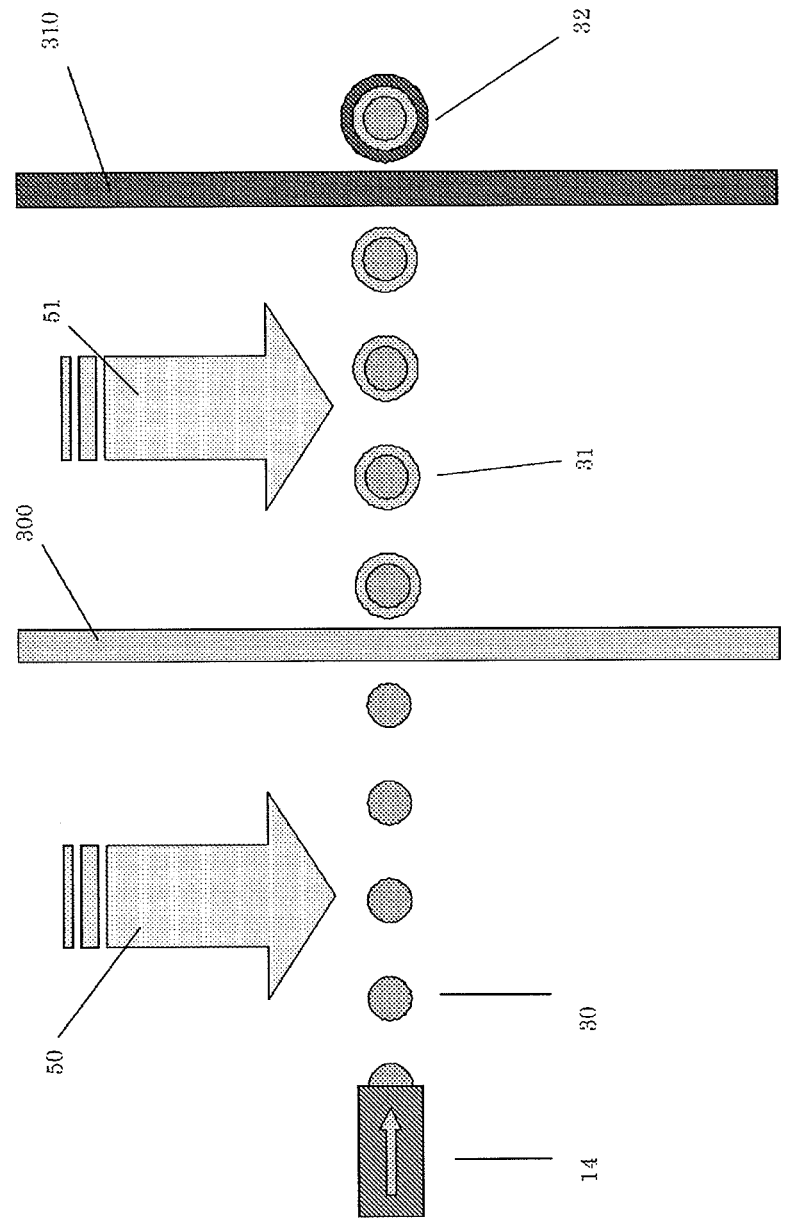
FIG. 6 shows schematically a multi-stage embodiment of continuous droplet generating system according to the invention.

Referring to FIG. 6 a first embodiment is illustrated wherein particles 30 are produced by nozzle 14 that are generally immiscible with fluid jet 300. In addition a second fluid jet 310 is provided to illustrate the possibility of having colliding a droplet 30 with several fluid jets 300, 310 in order to form multilayer particles 31, 32 or particles comprised of a plurality of components.

In this first embodiment a "true encapsulation" of the particles 30 with fluid jet material 300 is formed, optionally also by additional fluid jets 310 and higher. Thus, the particles are formed as a core having an encapsulation formed around the core. Accordingly, complex multilayered/multimaterial particles 32 can be formed according to one aspect of the invention. Applications can be for example toner fillings or photography related applications or an application where uniform droplet sizes are of importance for example for providing solder paste. In one embodiment solder balls can be formed by emitting solder droplets and having them coated with the flux provided by a fluid jet. With this process solder balls can be coated with a small amount of flux to generate highly efficient solder paste. Another application can be in food, feed, pharma, cosmetics and other areas where a stabilization or protection of sensitive ingredients is needed. For example by encapsulating these with a permeation-limiting shell material. These ingredients can be protected from degradation by the aforementioned parameters, in order to increase the shell-life of certain products or to enable the use of hitherto unusable ingredients. In this respect the fluid jet material can be chosen to provide a chemically protective encapsulation, or to provide a UV-protective encapsulation. In this respect the protection is designed against an unexpected chemical treat or physical treat of the ingredients, for example but not limited to UV-light, or oxygen, water, PH, ions or chemicals. In addition the encapsulation can be provided to shield reactive ingredients, for example reactive polymers or glues or epoxy resins from environments. In this respect the first material is arranged to be chemically reactive with a for a predetermined environment parameter, for example but not limited to UV-light, oxygen, water, PH, ions or other chemicals. Degradation or rupturing of the encapsulation material may lead to release of the core material which would be able to provide materials that are self-repairing where such particles may be embedded in a matrix material or premixed two component glue.

The first droplet material may stay in any desired phase depending on material parameters including gas phase, liquid phase or solid phase. For example liquids such as water maybe encapsulated by a solid encapsulation to provide particles filled with water. These might be used to generate instant ready meal without the need of adding extra water. The advantage of having encapsulated is that the water releases when it is necessary and not beforehand.

Another application could be wherein these second materials arranged to be chemically reactive with the predetermined chemical reactant, to provide a triggered release of the first material embedded in the encapsulation. Also the second material can be designed to have suitable material properties to have a predetermined permeability to the first material that is encapsulated inside to provide a time delayed release of the first material. In particular, depending on shell material, particles 31 can be made that can be used as slow or triggered release applications. By selecting a shell material that has a degree of permeability the payload can diffuse out of the particles with a diffusion rate depending on the permeability of the shell.

Alternatively a shell material can be selected that is impermeable until made permeable by a certain trigger (e.g. water, enzymes, pH, temperature, mechanical energy . . . ). This will then result in a release of the payload as described above. In addition, complete and instantaneous release of the payload may also be achieved as a result of a trigger.

Applications for these types of systems can be found in food, feed, and pharma, where release in specific areas in a digestive tract is required; this can be achieved by the action of enzymes present in the various parts of the in a digestive tract.

Another application may be in personal care, where a body cream may contain particles (e.g. perfume, deodorant) that, upon heating, rupture or melt to release an ingredient (e.g. menthol or ethanol), that will produce a cooling or soothing effect.

Other applications may be found in the slow release of fragrances (cosmetics, home care), antibacterial (paint, anti fouling coatings), antioxidants (food, feed).

As shown in FIG. 2 the method can be extended to a collided droplet 31 with a further fluid jet 310. This provides a possibility to encapsulate two or more ingredients that need to be kept apart (e.g. to reactivity). An example may be two component glue: wherein a particle is ruptured, the two components are released and will react. Another example of a multiple layered particle may be a particle that is releasing one or more active ingredients in a time delayed manner. That is each of the ingredients may be released by different or identical triggers which could be used to release various compounds in different parts of a digestive tract and responds to the presence of different enzymes present in the various parts of the digestive tract. Whereas in FIG. 2 a pre-treatment 50 is illustrated, also a post-treatment step 51 can be performed such as heating, cooling, drying or gas treatment or any other UV treatment or other techniques to post process the particles 31. For pre-treatment 50 this may be aimed at providing a droplet that is immiscible with the fluid jet material in order to provide a well defined encapsulation. This may equally apply to the encapsulation of liquefied gasses. According to the invention the method provides a plurality of coated particles that could be received on a substrate to provide a matrix of particles having a predetermined interspacing. To have the particles placed at a fixed distance from each other coloring effect can be generated by interference of light. In particular particles can be distanced optically by having a transparent coating of a predetermined thickness. Placing these particles against each other provides a control distance between core particles. Other application could be providing encapsulated biomaterials such as cells or viruses. Another application could be even providing encapsulated solid objects such as plant seeds to have them coated with predetermined coating materials for example to provide antifungal or germination enhancing effects.

Figure 7:
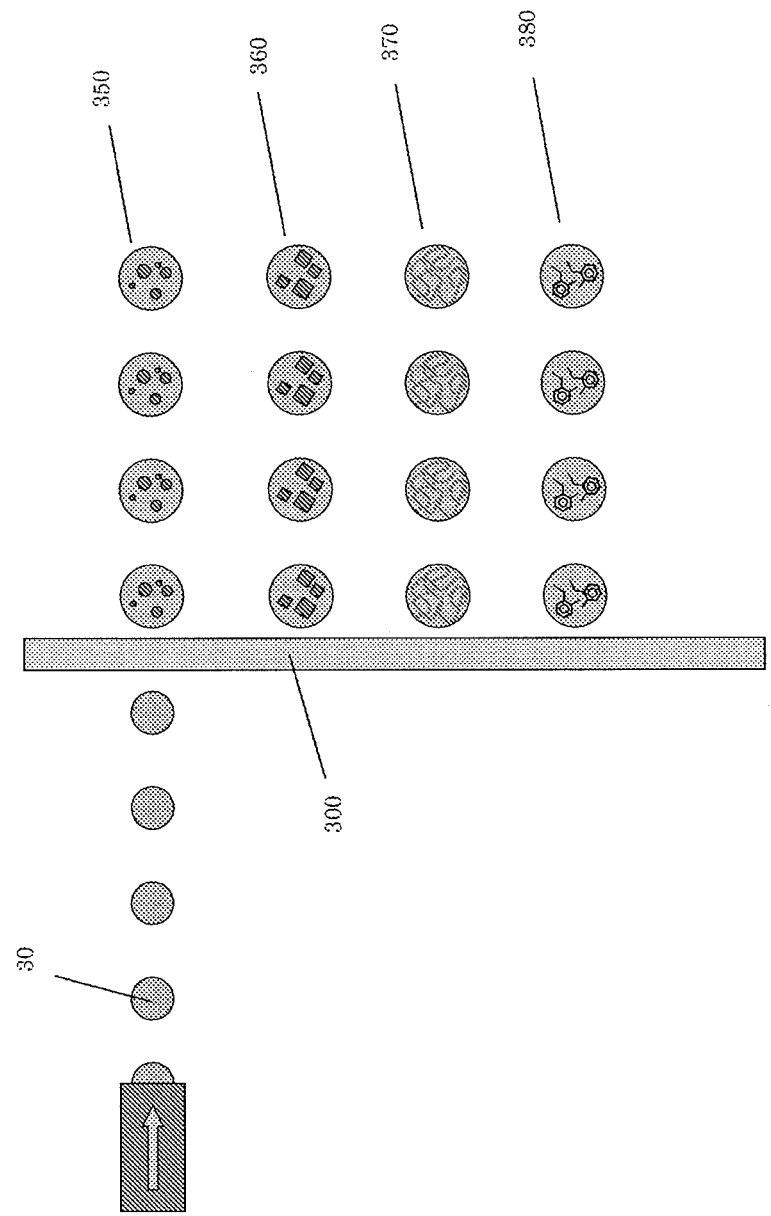
FIG. 7 shows some application examples of the method according to the invention.

FIG. 7 shows a further aspect of the invention, wherein the droplet material 30 and the liquid jet material 300 are chosen to be of a miscible nature, to provide a mixed multicomponent droplet. In contrast to the encapsulated droplet, here the material 30 and 300 are mixed, which could result in emulsified, crystallized or gelated droplets, depending on the materials and conditions chosen, for example this set-up can provide micro-compartmentalized entities or microreactors, which can form a free environments wherein reactions or processes can be employed that are difficult to control in other set-ups due to strong heat effects and/or risks of explosion.

Applications may be found in pharma where emulsions are frequently used. The potentially small particle size would result in a large surface area per weight, and hence a faster dissolution or better uptake in vivo, potentially leading to higher bioavailability (administration: dermal, pulmonal, mucosal, oral).

The same holds true for food, feed, and cosmetic applications. In addition, smaller emulsions are of interest for pharma, food, and cosmetics as the sensory perception of such small emulsions may be more desirable.

Other applications of these types of emulsions may be found in the paint industry where emulsions are frequently used.

Solidification of the small (inner) droplets might result in interesting nanomaterials, or particles that may have applications in heterogeneous catalysis.

In a second embodiment 360, similar to the previous system, particles 30 may comprise a solid compound (non-water-soluble) dissolved in ethanol. Printing drops of this solution through screen 300 (e.g. water) would then result in precipitation or crystallization of the solid compound. Analogously to the emulsion system, the size of the solid particles might well be very small, allowing the formation of nanoparticles or nanocrystals. In addition the particle size might be very monodisperse. (Note: crystallization may also be induced by a change in pH, salt concentration or some other parameter.)

Small particles have large surface area per weight and therefore are interesting for applications in pharma, food, feed, and cosmetics as explained for the emulsion system (i.e. bioavailability). Also the sensory perception argument holds true.

Again this system may be interesting for the production of catalyst particles or (nano)particles with nanomaterial applications.

In a third embodiment 370 rather than leading to emulsification or precipitation, the mixing of solution 1 and 2 may result in gelation of the particle. An example of this may be to print drop of a Na-alginate solution through a Ca2+ solution screen, thus producing microgel-particles. Microgel particles are being investigated widely for various applications ranging from drug delivery devices to environmental applications in which they may be used as nanosponges.

In addition, the use of a printing setup allows one to start with a relatively viscous solution (i.e. a concentrated polymer solution), resulting in gel particles with a very high solid content not easily attainable by other methods.

As gels generally consist of two separate but each continuous phases, the removal of one of the two phases would result in a micro/macroporous material of well defined size (monodisperse) that would have zeolite-like properties.

In a fourth embodiment 380, the mixing of several reactants by coalescence of particles 31 and fluid jet 300 can be used to carry out chemical reactions. Each drop would function as a micro reactor, giving many of the advantages for which micro fluidic devices are currently being investigated. Heat effects and dangerous compounds would be easier to control, however, the continuous process would still allow the production of significant quantities of material.

It should be noted that the mixing embodiments 350, 360, 370 and 380 can be used in addition to the encapsulation embodiment discussed in FIG. 2. It will be appreciated that in the transmissive mode, generally, as shown in FIG. 7, the particles will be provided with a substantially complete encapsulation or complete intermixing, depending on the material, with fluid of the fluid jet 300. In contrast, in the reflective mode, such encapsulation may be only partial. Accordingly the coating can be non-symmetric with respect to color, polarity, hydrophilic and/or surface chemistry characteristics resulting in different binding or reaction sites. One exemplary use can be as E-ink wherein particles are coated white and black on respective sides and can be addressed to show either white or black when in addition they are having a suitable polarity that can be oriented, for example by electrodes in a conventional way. This can result in higher resolution images since the particle size can be smaller than 250 micron. Also a plurality of colors, for example three different colored sides may be possible. Another application may be used of these asymmetric coated particles as macro surfactants, for example for novel types of emulsion stabilizers or as compatibilizers for gluing of two different materials. In particular, as particles can be made with different properties on each end, they may be applicable for us as material for coatings, and could for example convert hydrophobic surfaces to hydrophilic.

In addition, they may be used as additives for self-stratifying layers. When for example embedded in apolar matrix, the polar part of the particles will make them diffuse to the surface.

When applied in such coatings the shape of the particles and their organization in the layer can result in optical effects or a lotus effect.

In the above illustrated examples a method has been demonstrated of generating a multicomponent particle comprising: accelerating particles supplied on a movable support; generating a generally uninterrupted fluid jet without breaking up along at least part of a circumference of the movable support; colliding said accelerated particles with the fluid jet so as to combine said particle with the fluid jet material; and capturing said isolated particles after collision with the fluid jet.

In this respect it is noted that the term "generally uninterrupted" refers to a fluid jet, without dividing up into separate droplets by Rayleigh break up effect or by any other disturbance such as mixing or combining of flows when collided, except, of course the collision of the particle itself. However, more downstream of the jet such could be taking place without consequences for the particle encapsulation. By providing a curtain form liquid of a generally planar shape a generally large impact area can be provided so that a plurality of particle beams can be aimed at the fluid jet and large quantities of particles can be produced.

Further, applied pressures can range from 0.1-3000 bars and applied temperatures can range from −200 to +1800° C. Viscosities may range from $0.5 \cdot 10^{-3}$ to $3000 \cdot 10^{-3}$ Pa·s. upon exit. In addition, the term "fluid" may encompass, without limitation, a liquid or liquid mixtures; solutions; emulsions; dispersions or melts, and may include gasses or liquefied gasses. Furthermore, although the invention has been described with fluid particles as embodiments, other types of particles may be applied likewise, such as solid grains or seeds etc. The invention has been described on the basis of an exemplary embodiment, but is not in any way limited to this embodiment. Diverse variations also falling within the scope of the invention are possible.

The invention claimed is:

1. A multicomponent particle generating system comprising:
   a movable support constructed to accelerate particles supplied on the movable support;
   a particle supply system for supplying the particles to the movable support;
   at least one nozzle arranged to generate a uninterrupted fluid jet along at least part of a circumference of the movable support without breaking up; to have said accelerated particles collide with the fluid jet in a transmissive mode to have the isolated particles transverse the fluid jet from one side to the other side, so as to combine said particles with fluid of the fluid jet, for providing a multicomponent particle; and
   a collector arranged in the free flight trajectory of said particles on the other side of the jet, by which said particles can be captured after collision with the fluid jet.

2. A multicomponent particle generating system according to claim 1, wherein said nozzle is slitted to produce a sheet form uninterrupted fluid jet.

3. A multicomponent particle generating system according to claim 2, wherein said nozzle is formed to have the fluid jet enclose the movable support along a circumference of the support.

4. A multicomponent particle generating system according to claim 1, wherein the movable support comprises a rotating disc or a linear conveyor system.

5. A multicomponent particle generating system according to claim 1, further including a shield structure to shield the fluid jet from wind turbulence induced by the movable support, the shield comprising a release opening arranged in a trajectory of the particles, to release the particles through the shield towards the jet.

6. A multicomponent particle generating system according to claim 5, wherein the shield structure comprises a closed or at least semi closed box, to prevent air flowing into the box.

7. A multicomponent particle generating system according to claim 6, wherein the box is provided with an evacuation pump.

8. A method of generating a multicomponent particle comprising:
   accelerating particles supplied on a movable support;
   generating a uninterrupted fluid jet without breaking up along at least part of a circumference of the movable support;
   colliding said accelerated particles with the fluid jet in a transmissive mode to have the isolated particles transverse the fluid jet from one side to the other side so as to combine said particle with the fluid jet material; and
   capturing said isolated particles on the other side of the fluid jet after collision with the fluid jet.

9. A method according to claim 8, further comprising applying a pretreatment to said isolated particle prior to colliding said particle to said first fluid.

10. A method according to claim 9, wherein said pretreatment is aimed at providing a particle immiscible with the second material.

11. A method according to claim 8, further comprising applying a posttreatment to said collided particle after said collision with said fluid jet.

\* \* \* \* \*

UNITED STATES PATENT AND TRADEMARK OFFICE
CERTIFICATE OF CORRECTION

PATENT NO.       : 8,528,496 B2                              Page 1 of 1
APPLICATION NO. : 13/002646
DATED            : September 10, 2013
INVENTOR(S)      : Houben et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 292 days.

Signed and Sealed this

Fifteenth Day of September, 2015

Michelle K. Lee
*Director of the United States Patent and Trademark Office*